United States Patent [19]

Erickson

[11] Patent Number: 5,097,676

[45] Date of Patent: Mar. 24, 1992

[54] VAPOR EXCHANGE DUPLEX GAX ABSORPTION CYCLE

[76] Inventor: Donald C. Erickson, 1704 S. Harbor La., Annapolis, Md. 21401

[21] Appl. No.: 602,506

[22] Filed: Oct. 24, 1990

[51] Int. Cl.$^5$ .............................................. F25B 15/00
[52] U.S. Cl. ....................... 62/476; 62/495; 62/238.3
[58] Field of Search ............... 62/476, 101, 495, 238.3

[56] References Cited

U.S. PATENT DOCUMENTS

| | | | |
|---|---|---|---|
| 4,311,019 | 1/1982 | Rojey et al. | 62/101 |
| 4,442,677 | 4/1984 | Kauffman | 60/673 |
| 4,531,374 | 7/1985 | Alefeld | 62/79 |
| 4,542,629 | 9/1985 | Biermann | 62/476 |
| 4,548,048 | 10/1985 | Reimann et al. | 62/238.3 |
| 4,551,991 | 11/1985 | Miyoshi et al. | 62/476 |
| 4,688,399 | 8/1987 | Reimann | 62/485 |
| 4,732,008 | 3/1988 | DeVault | 62/79 |
| 4,921,515 | 5/1990 | Dao | 62/335 |

OTHER PUBLICATIONS

P. Vinz, "New Design of an Ammonia Water Cooling Process", Dec. 1986, IEA Newsletter, pp. 26–34.
B. Phillips, Proceedings of the 2nd DOE/ORNL Heat Pump Conference: Research and Development on Heat Pumps for Space Conditioning Applications published by the Oak Ridge National Laboratory, CONF-8804100, Aug. 1988.

*Primary Examiner*—Alber J. Makay
*Assistant Examiner*—John Sollecito

[57] ABSTRACT

Apparatus and process are disclosed for increasing the sorbate content of a sorbent liquid beyond the level possible at a defined absorbing temperature and pressure. Specific useful results obtainable thereby are an increase in the efficiency of thermally actuated absorption processes such as absorption compression and absorption heat pumping. The improvement allows greater temperature overlap between generator and absorber, ambient responsive performance, and virtualy elimination of the need for rectification. Referring to FIG. 1b, the useful result is obtained by pressurizing (1) and splitting (2) the sorbent to supply an absorber (3) with cooling (4) and a generator (5) with heating (6), and routing (7) generator sorbate vapor to the absorber to achieve increased dilution therein.

23 Claims, 7 Drawing Sheets

VAPOR EXCHANGE DUPLEX GAX ABSORPTION CYCLE

TECHNICAL FIELD

This invention relates to absorption vapor compressors such as are found in continuous cycle heat pumps based on the absorptive principle, i.e., wherein a condensable vaporous working fluid is successively absorbed into and desorbed out of a circulating absorbent solution. The improved cycle described herein applies to all known types of absorption heat pumps: residential and commercial space heating and cooling types; industrial refrigeration and industrial heat pumping; cryogenic refrigeration; heat or cold storage; open cycle, semi-open or closed cycle types; and any type of absorbent, whether volatile or non-volatile.

BACKGROUND

In a historically known absorption cycle, the "Generator-Absorber Heat Exchange" (GAX) cycle, heat is exchanged from the hottest section of an absorber at suction (evaporator) pressure to the coldest section of a generator at delivery (condenser) pressure. That "internal" heat exchange permits a corresponding reduction in the external heat which must be supplied to the hot section of the generator.

The GAX absorption cycle presents substantial advantages in the operating regime where the GAX effect is possible, i.e., where there is temperature overlap between part of the absorber and part of the generator. Those advantages include good efficiency (high COP); ambient-responsive efficiency (COP increases markedly as required lift decreases); very low pumping requirements (minimal parasitic losses); and reduced requirements for heat transfer surface in comparison to a comparably rated single-effect cycle.

The GAX cycle also has the advantage that it automatically defaults to an efficient single-effect cycle when the temperature overlap disappears.

Notwithstanding the above advantages, there nevertheless remain at least three shortcomings of the conventional GAX cycle. They include: 1) the heat mismatch between GAX absorber and GAX generator; 2) the loss of temperature overlap at a lift equivalent to the ideal double-effect lift; and 3) when volatile absorption working pairs are used, the need for a rectifier.

The first shortcoming derives from inherent properties of solutions. In the overlap temperature range, the generator solution is at a weaker (more diluted by refrigerant) concentration than the absorber solution. Therefore the generator solution concentration changes more rapidly with temperature, and correspondingly the heat release changes more rapidly with temperature.

Copending U.S. application Ser. No. 521994 filed on May 11, 1990 by Donald C. Erickson discloses one means of overcoming the heat mismatch shortcoming. Instead of having the same flow of absorbent component through all absorbers and generators, that application discloses increasing the flow of absorbent component through the externally heated generator and the GAX absorber, and correspondingly reducing the flow of absorbing component through the externally cooled absorber and GAX generator. That is done by incorporating a branch flow of absorbent: a second absorbent pump takes suction from between the two absorbers and discharges to between the two generators. This increases the GAX absorber heat release and decreases the GAX generator heat demand until a match is achieved over the full overlap range.

The second shortcoming, that temperature overlap only occurs at relatively low lifts, greatly reduces the usefulness of the GAX cycle. The low-lift regime where the GAX effect occurs is unfortunately the same regime where extensively developed alternative heat pumps are available, namely the mechanical compression heat pump. It would be very desirable to extend the overlap between GAX generator and GAX absorber to higher lifts, i.e., beyond the ideal double effect life. This would improve the GAX cycle efficiency in the low-lift regime where it competes against mechanical compression heat pumps. More importantly, it would also increase the GAX cycle efficiency beyond that of a single effect cycle in the higher lift regimes where mechanical compression is no longer effective. This extension of the temperature overlap range, and corresponding increase in GAX cycle COP, is one primary objective of the invention disclosed herein.

The third shortcoming of the GAX cycle is that it requires the same amount of rectification as a single effect cycle does when a volatile absorption working pair is used. In general, higher lifts cause there to be larger trace amounts of sorbent in the desorbed sorbate vapor. To prevent accumulation of liquid sorbent in the evaporator, the vapor is rectified with a reflux liquid, which causes an efficiency reduction proportional to the amount of reflux liquid used. It would be desirable to reduce or eliminate the need for rectification in all types of absorption cycles, not just in the GAX cycle. That is another objective of this disclosed invention.

One way to reduce or eliminate the efficiency penalty of rectification is to use a super-dilute absorbent. A super-dilute absorbent is one which has absorbed more sorbate than is possible to absorb at suction (evaporator) pressure and at the temperature of the externally cooled absorber. In the article "New Design of an Ammonia-Water Absorption Cooling Process . . ." by P. Vinz appearing at pages 26-34 of the December 1986 IEA Newsletter (Vol. 4 No. 4), Vinz discloses further enrichment (super-dilution) of a minor sidestream of absorbent by cooling it in a supplementary absorber to a lower temperature than the primary absorber and absorbing evaporator vapor. The enriched absorbent stream then is supplied to an auxiliary rectifier which yields a partially rectified vapor stream. That stream is partially condensed in a dephlegmator, and the resulting condensate is used to reflux the primary rectifier. Thus no external cooling is required to accomplish the rectification other than that supplied to the abnormally cool supplementary absorber.

The disadvantages of the Vinz disclosure are that it requires a source of cooling significantly colder than that supplied to the primary absorber, which is normally not available, and also that it requires numerous additional components, including the supplementary absorber and pump, the auxiliary rectifier, and the dephlegmator.

Figure 2:
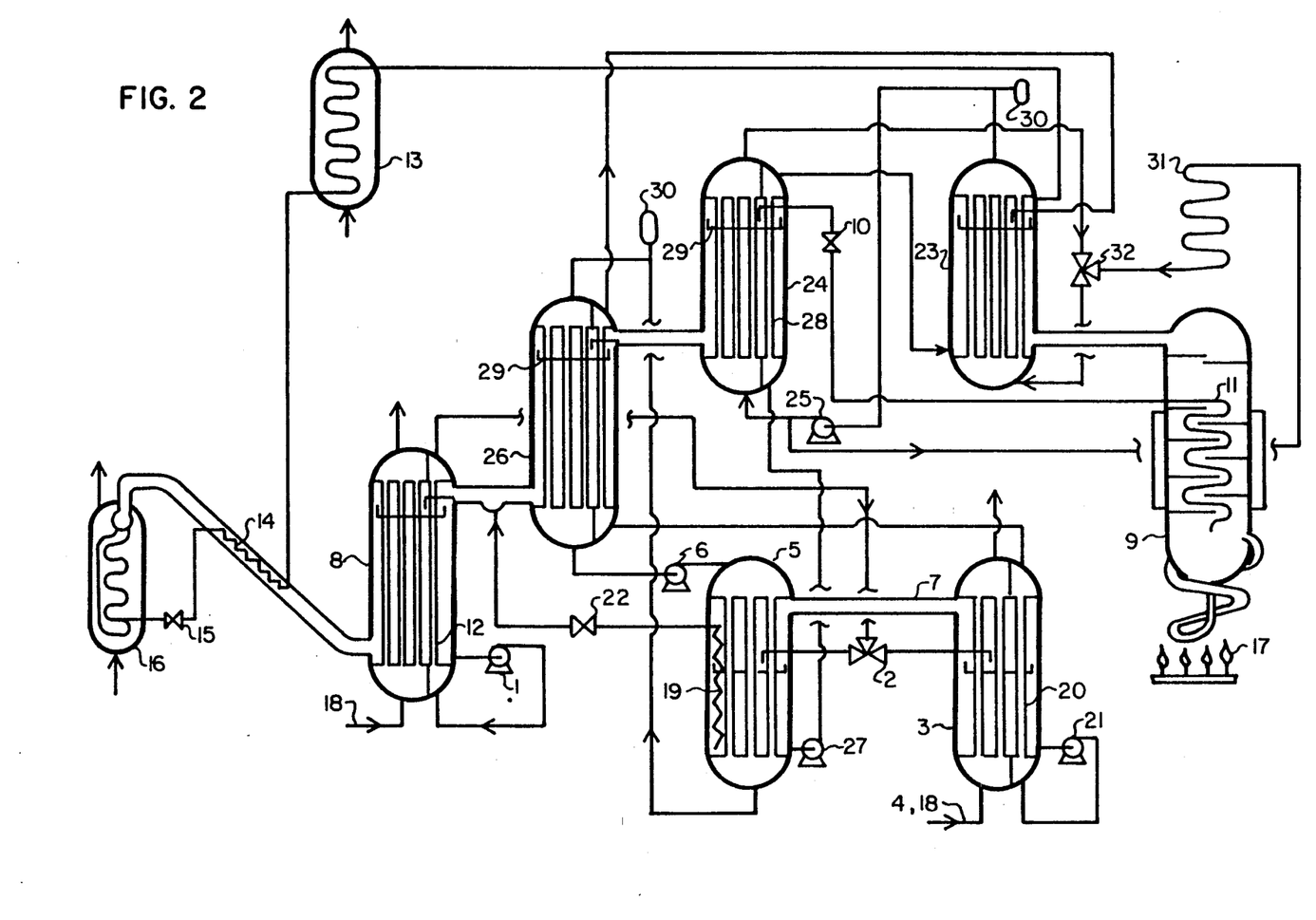

A second approach to obtaining a super-dilute absorbent is described in U.S. Pat. No. 4,311,019. In FIG. 2 of that patent Rojey et al., disclose a first cocurrent absorption of evaporator vapor at high temperature, a second externally cooled low temperature cocurrent absorption of evaporator vapor, using only part of the absorbent, and then pressurization of that fraction of the absorbent to an intermediate pressure. The pressurized partial stream of absorbent is then cocurrently desorbed by countercurrent heat exchange from the first cocurrent absorption. Next a liquid sidestream is separated from the resulting vapor-liquid mixture. Then the remaining intermediate pressure vapor-liquid mixture is liquefied in two steps by two more cocurrent absorptions. The latter (fourth) absorption is externally cooled at low temperature, and the resulting super-diluted absorbent is pumped to delivery pressure. The absorbent is then cocurrently desorbed by countercurrent heat exchange with the former (third) cocurrent absorption. The resulting vapor-liquid mixture is fed to an intermediate height of the rectification column. Rojey et al., also disclose an alternative to the liquid separation step: providing a second evaporator at higher temperature and pressure, and adding its vapor to the fluid mixture from the first cocurrent desorption rather than removing liquid. Thus the Rojey et al., disclosure for obtaining super-dilute absorbent involves three heat/mass exchanges: the absorbent to be super-diluted is first concentrated in a generator. Then diluted to the original concentration, and only then further diluted to super-dilute.

The methods disclosed by Rojey et al., to produce super-dilute absorbent present several disadvantages. First, many components or steps are required: four cocurrent absorptions; a separation or a second evaporation; two cocurrent desorptions; and two internal (GAX) heat exchanges. Secondly the first two cocurrent absorptions entail large mixing losses. Thirdly, the temperature span of the first GAX exchange is necessarily much narrower than the second, thus reducing efficiency. Finally, the manner in which the super-dilute absorbent is used, namely cocurrent desorption followed by supplying the mixture to an intermediate height of the rectification column, fails to realize any rectification reduction benefit which might otherwise be attainable.

A third prior art disclosure of a method to produce super-dilute absorbent appears in U.S. Pat. No. 4,921,515. In FIG. 2 of that patent, Dao discloses a multiplicity of generators, each operating in the same high temperature range (supplied by the same heat source) and each at a different pressure. The absorbent solution is circulated sequentially through all generators in order of decreasing pressure. Then it is circulated through a GAX absorber at suction pressure. Next it is circulated sequentially through a multiplicity of externally cooled absorbers, all at the same low temperature, and each at a different pressure. Each different pressure absorber receives vapor from the corresponding pressure generator. The absorbent is circulated through the absorbers in order of increasing pressure, i.e., a separate pump is required for each additional absorber. Each additional stage of absorption causes further super-dilution of the absorbent.

This method of super-diluting the absorbent also entails several disadvantages. Since each intermediate pressure generator is at a substantially different absorbent concentration than its associated absorber, the vapor it desorbs is at a significantly different concentration than the absorber equilibrium vapor, and hence mixing losses occur. This is exacerbated by using cocurrent mass exchange generators. Secondly, each intermediate pressure absorber demands much more vapor than the associatd generator can supply, again due to the concentration difference. For that reason, a multiplicity of additional pumps are required (87a-f) which pump the excess absorbent from each absorber up to delivery pressure. Third, high temperature heat is required to supply the vapor for each stage of super-dilution, i.e., heat that could otherwise be used to provide delivery pressure vapor in a conventional cycle. Fourth, the super-dilute absorbent is not employed in a manner which allows it to reduce or eliminate the rectification. The super-dilute absorbent is combined with less dilute absorbent streams before supply to the generator; then it is subjected to cocurrent mass exchange vice the required countercurrent; and finally the resulting vapor is combined with an extremely low quality vapor before feeding to the rectifier (66).

It has now been discovered that the availability of super-dilute absorbent for use in a generator or absorber at delivery pressure provides or makes possible four advantages. First is the increased GAX temperature overlap. Up to one third of the heat normally released from the externally cooled absorber can now be released from the GAX absorber, for delivery to the GAX desorber and resulting decrease in heat needed at the externally heated desorber. Second, with volatile absorption working pairs, the need for rectification is either eliminated or greatly reduced, because the refrigerant vapor exiting the "super-dilute" generator (or absorber) is substantially purer than that from a conventional generator. Third, a small benefit is obtained from the lower heat of desorption characteristic of more dilute absorbents—less heat is necessary to yield a given amount of refrigerant. Fourth, since the super-dilute absorbent generator operates at a colder temperature than the conventional generator, it can utilize low temperature heat which would otherwise be wasted, for example in flame-fired units it can further cool the exhaust gas.

It is noted, however, that the availability of super-dilute absorbent merely makes possible the above advantages—they will not be achieved unless appropriate enabling structure is also present.

Thus the most basic objective of this invention is a new and advantageous means of achieving a super-dilute absorbent: a means which does not require an abnormally cold source of cooling for an auxiliary absorber; a means which does not require three sequential heat/mass exchanges to produce the super-dilute absorbent; and a means which does not require the use of high-grade heat to produce the vapor required for super-dilution. Beyond that, however, the objectives of this disclosure also include recitation of enabling structure which permit the super-dilute absorbent to achieve greater GAX temperature overlap; to eliminate or reduce the required rectification; to permit increased heat match in the GAX absorber and GAX generator; and to permit ambient-responsive performance and better than single-effect performance at lifts greater that the ideal double effect lift.

DISCLOSURE OF INVENTION

In its most generic aspect, this invention provides for additional dilution of an absorbent which is used to absorb a suction pressure vapor while being cooled by a source of cooling. The invention is comprised of the means for diluting the absorbent beyond the degree of dilution which is possible with the current values of suction pressure and cooling temperature. That is accomplished by pressurizing the absorbent, splitting it into at least two streams, heating one stream in a vapor exchange (VX) generator; cooling the other stream in a VX absorber; and transferring vapor (sorbate) from the VX generator to the VX absorber. The absorption of suction pressure vapor which precedes the above steps is preferably conducted countercurrently in order to maximize the starting level of dilution.

Preferably, and particularly when a volatile absorbent is used, the vapor in the VX generator should be generated by countercurrent vapor-liquid contact. The VX absorber mass exchange is preferably conducted cocurrently.

In various preferred embodiments, one of the VX generator and the VX absorber will be internally heat exchanged with another cycle component, and at least one will also be provided with absorber heat exchange (AHX) or generator heat exchange (GHX) of its exiting or entering absorbent solution.

The primary beneficial use presently envisioned for the above disclosure of means/apparatus for super-dilution of an absorbent liquid is in an absorption cycle process/apparatus for at least one of compressing a vapor, heating, and cooling. In that application, the super-dilution apparatus is combined with at the minimum an externally-cooled absorber at suction pressure and a generator (desorber) at delivery pressure. When the absorption compressor or heat pump is closed cycle type, there will also be a condenser at delivery pressure and an evaporator at suction pressure, or their equivalents (e.g., in a resorption cycle, a resorber and a cold desorber). If either or both of those components is not present, the absorption compressor or heat pump is of open cycle type.

There are three primary embodiments of the combination of VX dilution apparatus with absorption compression/heat pump apparatus, dependent upon whether the pressure of the VX absorber and generator is less than, equal to, or greater than the delivery pressure of the absorption compressor. Each embodiment presents certain advantages and drawbacks, as described below. Also, several variations are possible within each embodiment.

Adding the VX absorber-desorber apparatus to an absorption cycle apparatus makes major improvements in performance and efficiency possible, provided certain key features are incorporated in the cycle. Without those features, the potential advantages are largely negated.

In particular, it is necessary to avoid large mixing losses, which arise when two fluid streams of different temperature and/or different equilibrium concentration are contacted. Those losses are avoided by:

- conducting all generator heating and absorber cooling countercurrently;
- conducting all generator mass exchanges countercurrently;
- conducting all absorber mass exchanges countercurrently except for the VX absorber, which is done cocurrently;
- in addition to the conventional AHX and GHX sensible heat exchanges, also incorporate at least one new type of AHX/GHX on at least one of the VX absorber and VX generator; and
- supply countercurrent (internal) GAX heat exchange to at least one of the VX absorber and VX desorber.

Note that when a nonvolatile absorption working pair is used, vapor phase concentration mixing losses can not occur, and hence the mass exchange distinction (counter vs. cocurrent) is no longer important.

In essence, in contrast to the heat exchange between generator and absorber which characterizes a GAX cycle, this VX cycle entails vapor exchange between a generator and absorber, using the same source liquid for both the VX absorber and VX generator, thereby ensuring no concentration mixing in the vapor exchange process.

The VX cycle preferably also entails at least two internal heat exchanges: at least one sensible heat exchange between a VX exchanger and either the influent or effluent sorbent liquid; and at least one latent heat exchange between a VX exchanger and another heat and mass exchanger operating at a different pressure.

BRIEF DESCRIPTION OF THE DRAWINGS

FIGS. 1*a*, 1*b*, and 2 illustrate the low pressure embodiment of this invention, where FIG. 1*a* is the thermodynamic state point diagram (pressure, temperature, and concentration); FIG. 1*b* is a simplified block diagram of the same cycle, and FIG. 2 is a simplified flowsheet of the same cycle. FIGS. 3*a*–3*g* presents the thermodynamic diagrams of several variants of the low pressure embodiment.

FIG. 4 is a simplified flowsheet of the most fundamental and generic embodiment of the disclosed invention, common to all three pressure embodiments.

FIG. 5 illustrates the efficiency advantages of the new absorption cycles incorporating the FIG. 4 apparatus, in comparison to known absorption cycles.

FIGS. 6*a* and 6*b* illustrate respectively the thermodynamic diagram and simplified block diagram of the high pressure embodiment of this invention. FIGS. 7*a*–7*d* illustrates several variations of the high pressure embodiment via thermodynamic diagrams. FIGS. 8*a*–8*b* illustrates the delivery pressure embodiment.

BEST MODE FOR CARRYING OUT THE INVENTION

Referring to FIG. 1*a*, sorbent liquid which has been cooled by external cooling 18 while absorbing suction pressure sorbate is then increased in pressure by means for increasing pressure 1, and divided into at least two streams by splitter 2. One stream is routed to VX absorber 3 which is cooled by source of cooling 4. The other stream is routed to VX desorber 5 which is heated by source of heating 6. Sorbate vapor generated in VX desorber 5 is transferred to VX absorber 3 via a conduit (not shown on FIG. 1*a*, conduit 7 on FIG. 1*b*). That vapor is absorbed, thereby super-diluting the sorbent.

The super-dilute absorbent is increased to delivery pressure by pump 21 and then supplied to generator 23, preferably to the vapor-exit end of a countercurrent mass exchanger 23. When there is temperature overlap between absorber 24 and generator 23, internal GAX heat transfer 25 is incorporated between those two units. The partly warmed, partly desorbed (concentrated) sorbent from GAX generator 23 is supplied to externally heated generator 9, heated by heat source 17. The fully desorbed (concentrated) sorbent is then let down in pressure to suction pressure by means for pressure reduction 10, and routed to GAX absorber 24, which preferably incorporates countercurrent vapor-liquid contact. The partly cooled, partly diluted sorbent from absorber 24 is supplied to absorber 26, which is cooled by and supplies heat to VX desorber 5 via means for heat transfer 6.

The sorbent effluent from absorber 26 is optionally admixed with at least part of the sorbent effluent from VX desorber 5 after pressure letdown via valve 22, and then supplied to externally cooled absorber 8, which is cooled by source of cooling 18 and which absorbs suction pressure vapor from evaporator 16.

Evaporator 16 is supplied refrigerant liquid from condenser 13 via means for pressure letdown 15, and delivery pressure vapor from generators 23 and 17 is supplied to condenser 13.

Preferably at least part of the sorbent effluent from VX desorber 5 is increased in pressure to delivery pressure by means for increasing pressure 27, and then supplied to one of generators 23 and 9. This makes it possible to match the heat duties of GAX generator 23 and GAX absorber 24 over the full temperature overlap range.

Figure 1A:
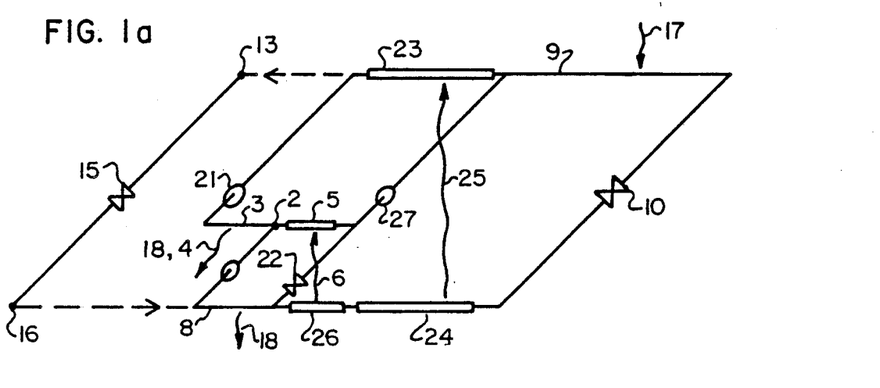

The FIG. 1a thermodynamic diagram incorporates the usual conventions that horizontal lines represent constant pressures, vertical lines represent constant temperatures, diagonal lines represent constant concentrations, solid lines represent liquid flows, dashed lines represent vapor flows, and wavy lines represent heat flows. In addition, heavy solid horizontal lines represent GAX components.

Figure 1B:
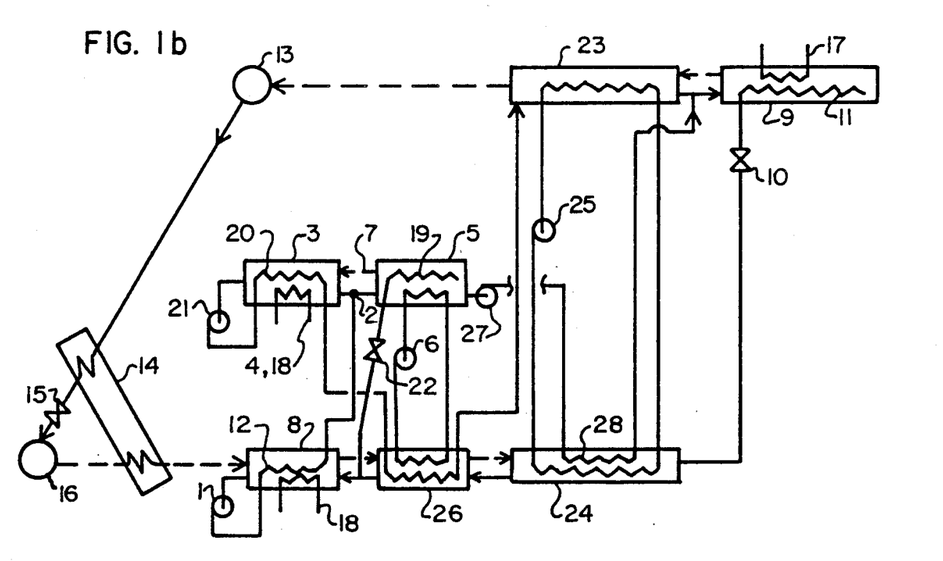

Referring to FIG. 1b, the same cycle as FIG. 1a is depicted in simplified block diagram form whereby the various external and internal heat exchanges are explicitly represented. Like-numbered components have the same description as in FIG. 1a The newly-represented components in FIG. 1b include: vapor transfer line 7 between VX generator 5 and VX absorber 3; GHX (generator heat exchange) sensible heat exchanger 11 which cools the effluent sorbent from externally heated generator 9 while causing additional desorption in generator 9; AHX (absorber heat exchange) sensible heat exchanger 12 which heats the effluent sorbent from externally cooled absorber 8 while providing additional cooling to that absorber; refrigerant subcooler 14; GHX exchanger 19 which cools sorbent effluent from VX generator 5 enroute to letdown valve 22; AHX exchanger 20 which heats sorbent effluent from VX absorber 3 enroute to generator 23; and AHX exchanger 28 which heats sorbent effluent from VX generator 5 enroute to generator 9.

Referring to FIG. 2, the same cycle is depicted as appears in FIGS. 1a and 1b, in simplified schematic flowsheet form. Like-numbered components have the same description as in FIGS. 1a and 1b. The various heat/mass exchange devices 3, 5, 8, 23, 24, and 26 are arbitrarily depicted as vertical falling film types, since that will frequently be the preferred choice. Thus each have a sorbent liquid distribution tray 29 near the top. The two closed cycle heat transfer circuits 6 and 25 each has a vapor accumulator 30 to regulate pressure and allow for liquid expansion. Note that it would be possible to combine heat transfer circuits 6 and 25 into a single circuit if desired. Also it is possible to provide auxiliary coil 31 and proportioning valve 32 in heat transfer circuit 25 in order to scavenge additional heat from hot exhaust gases from source of heat 17, and thus deliver that heat to generator 23. Where direct-fired heating of generator 9 is not allowed, heat transfer circuit 25 can be further expanded to transfer heat from flame 17 to externally-heated generator 9.

It will be apparent to the artisan that the several heat and mass exchanges depicted in FIG. 3 can be accomplished equivalently in other physical configurations. For example, the three sequential suction pressure absorptions (8, 26, 24) can all be located in a single vessel vice three separate vessels, and similarly for the two desorptions 9, 23. Also various other known configurations of heat/mass exchange are possible, including rotating members.

Referring to FIG. 3, everal variations of the FIG. 1, 2 embodiment of the invention are depicted on thermodynamic diagrams. All of these variations share the characteristic feature of FIGS. 1 and 2 that the pressure of the VX absorber and VX desorber is intermediate to the suction pressure and delivery pressure of the absorption compressor (or equivalently the evaporator pressure and condenser pressure of the absorption heat pump).

Figures 3A, 3B, 3C, 3D, 3E, 3F, 3G:
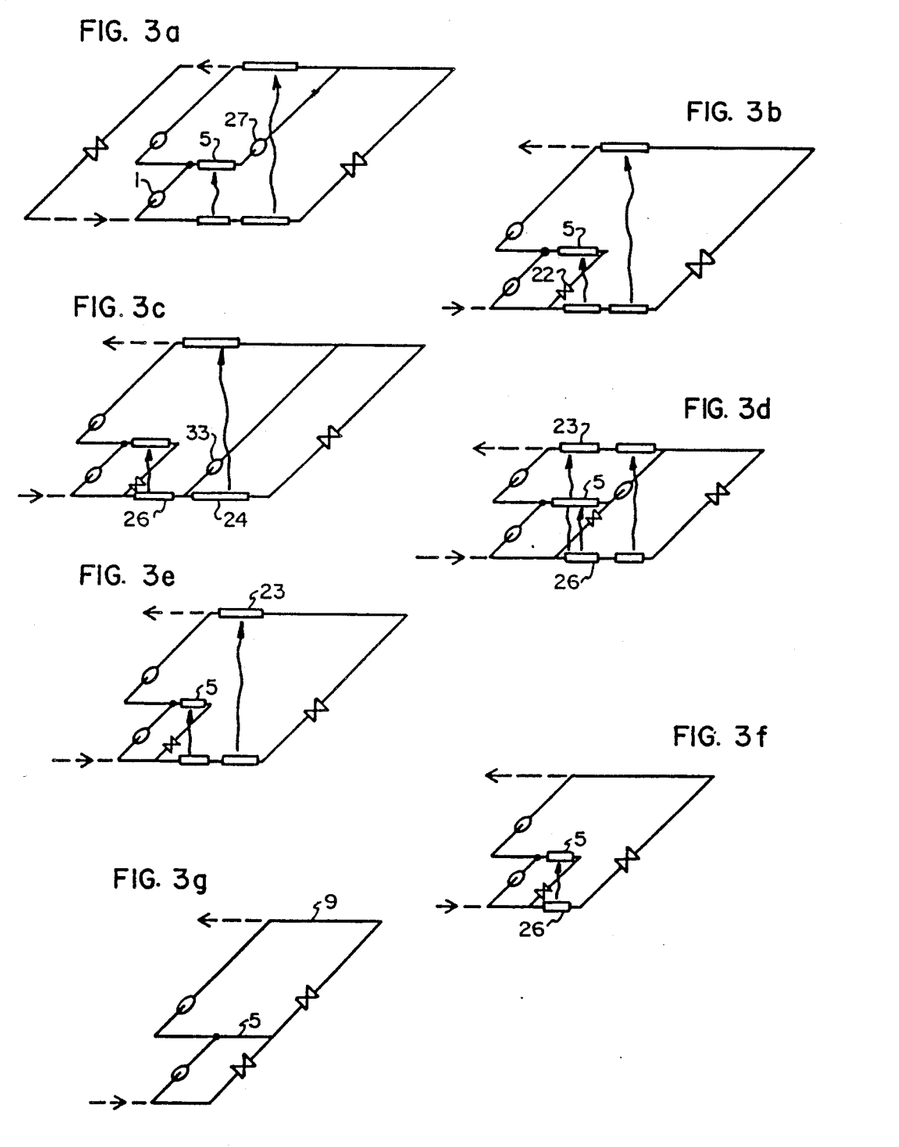

FIGS. 3a and 3b illustrate that the effluent from VX desorber 5 need not be split; it can all be pumped to delivery pressure in pump 27 as in FIG. 3a, or can all be reduced in pressure via valve 22 as in FIG. 3b. FIG. 3c illustrates another sorbent branch option: splitting sorbent flow between absorbers 24 and 26, and pumping one of the streams to delivery pressure via pump 33. FIG. 3d illustrates another means of supplying heat to VX desorber 5: dividing the heat released in GAX absorber 26 so as to provide heat to both VX desorber 5 and the cold end of GAX generator 23. FIG. 3e illustrates the situation of ideal double effect lift, wherein there is no longer any GAX overlap in a conventional GAX cycle. With the illustrated VX cycle, approximately one-third of the absorber heat can still be used for GAX heating of generator 23, another third for GAX heating of VX desorber 5, and only the remaining third of the absorber heat is rejected to external cooling. FIG. 3f illustrates the VX cycle in even higher lift situations, where GAX from suction pressure to delivery pressure is no longer possible. Even there, it is still possible to have GAX from suction pressure absorber 26 to intermediate pressure VX desorber 5, thus making possible super-dilution of the sorbent without supplying external heat to desorber 5. By supplying the super-diluted sorbent to the vapor-exit end of generator 9, and providing countercurrent vapor-liquid contact therein, the vapor exits in near-equilibrium with the super-dilute sorbent. This generally eliminates, or at least greatly diminishes, the need for rectification of that vapor, and hence substantially increases cycle COP.

Continuing the trend of FIGS. 3e and 3f, FIG. 3g illustrates the VX cycle in still higher lift situations, wherein no GAX overlap whatsoever can be realized. Even here the VX cycle is found to furnish an advantage. Note that VX desorber 5 is colder than generator 9. Thus if generator 9 is heated from a source of sensible heat, e.g., hot combustion gas, then VX desorber 5 can derive its heat from the cooled-down gas which is too cold to supply any more heat to generator 9. Once again the super-dilute absorbent is obtained without requiring additional prime energy input. And, in these very high lift scenarios, the rectification loss would otherwise be very substantial. For example, with the absorption working pair $NH_3$-$H_2O$, the FIG. 3g scenario would correspond to an evaporator temperature of −45° C. coupled with a condensing temperature of +40° C. At that high lift (85° C.), conventional cycles would experience rectification losses amounting to at least 10% of COP, whereas the VX cycle avoids that 10% reduction in COP. Also, since generator 9 extends to a colder temperature than would the generator of a conventional cycle, the VX cycle extracts more useful heat (at least 5% more) from the heating source. Thus even where no GAX overlap whatsoever occurs, the VX cycle is still at least 15% more efficient than a conventional single effect cycle. Another major advantage of the VX cycle is that it automatically transitions between FIG. 3e, 3f, and 3g configurations. As the required lift increases, pinching out first one GAX exchanger and then the other, those exchangers continue to provide needed sensible heat exchange when the latent component is no longer present.

Figure 4:
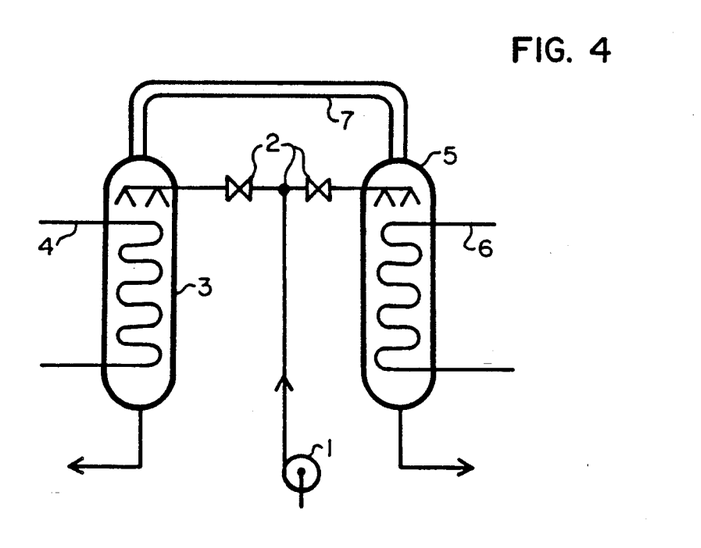

Referring to FIG. 4, this simplified schematic flowsheet depicts the most basic essence of the disclosed invention—the apparatus for super-diluting an absorbent with sorbate. The minimal apparatus necessary to accomplish this useful result is pump 1, means for splitting sorbent 2, VX absorber 3, means for cooling 4, VX desorber 5, means for cooling 6, and vapor transfer conduit 7, all operatively connected as in FIG. 4.

Figure 5:
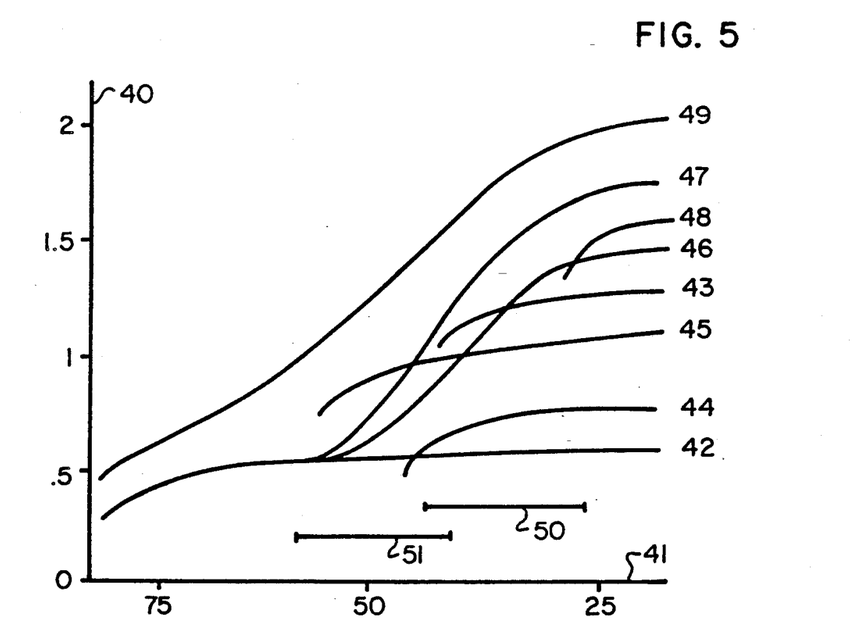

The efficiency or COP (Coefficient of Performance) advantages obtainable from proper incorporation of this super-dilution apparatus in an absorption cycle are illustrated in FIG. 5. In that figure, the vertical axis 40 is marked in units of COP, and the horizontal axis 41 is marked in units of heat pump temperature lift (°C.). The several curves indicate the approximate cooling COP vs. cycle lift characteristic of various known absorption cycles, as follows: single-effect $NH_3H_2O$ (42); single effect $LiBr-H_2O$ (42); double effect $LiBr-H_2O$ (43); double effect $NH_3-H_2O$ (45); GAX cycle (46); branched GAX cycle (47); and triple effect cycle (48). Curve 49 depicts the VX duplex GAX cycle characteristic when the generator temperature does not exceed 200° C. Useful lift is approximately 15° C. less than cycle lift, due to two heat exchanger LMTDs. The cycle lifts normally encountered during the cooling season are indicated by bar 50. Bar 51 indicates heating season lifts—the heating COPs are equal to the indicated cooling COPs plus one.

Thus it is seen that the VX duplex GAX cycle is more efficient than any previously know absorption cycle at every value of lift. Added to that advantage are: 1) it responds automatically to different lift conditions, thus taking full advantage of benign ambient periods; 2) the required equipment is relatively simple and low cost. For example, much of the low-effectiveness external heat exchange of prior art cycles has been replaced by highly effective internal heat exchange in the VX duplex GAX cycle.

Figure 6A:
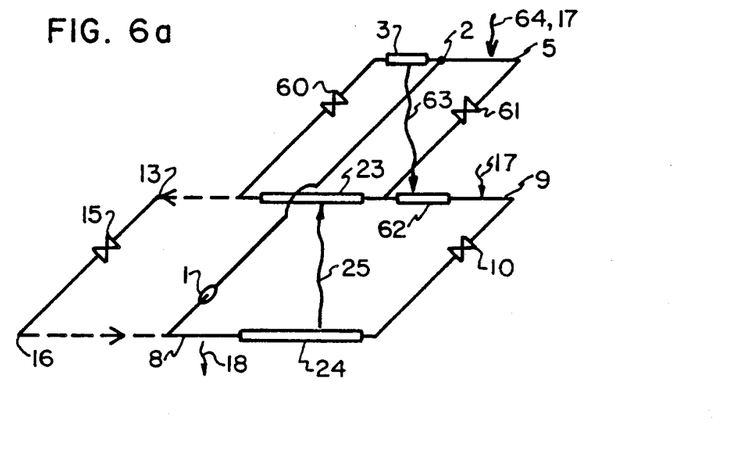

There are two more embodiments of absorption cycles which incorporate VX super-dilution, beyond that of FIGS. 1-3. The second embodiment, depicted in FIGS. 6 and 7, is characterized by the pressure of the VX absorber and VX desorber being greater than the delivery pressure. Referring to FIG. 6a, pump 1 increases sorbent pressure, splitter 2 divides it, with one split routed to VX desorber 5 heated by source of heat 64 (in this embodiment externally-supplied heat 17), and the other split to VX absorber 3 which is cooled by source of cooling 63. Effluent super-dilute sorbent from VX absorber 3 is letdown in pressure to delivery pressure via valve 60, and supplied to the vapor exit end of the generator complex comprised of GAX generator 23, GAX generator 62, and externally heated generator 9 (heated by heat source 17). Sorbent effluent from VX generator 5 is letdown in pressure by valve 61 and added to the sorbent supply to GAX generator 62. Sorbent effluent from generator 9 is letdown in pressure to suction pressure by valve 10, and supplied to the absorber complex comprised of GAX absorber 24 (which heats GAX desorber 23 via heat transfer circuit 26) and externally-cooled absorber 8, which is cooled by source of cooling 18. Delivery pressure vapor from the generator complex (23, 62, 9) is condensed in condenser 13, letdown to suction pressure by valve 15, and evaporated in evaporator 16.

Figure 6B:
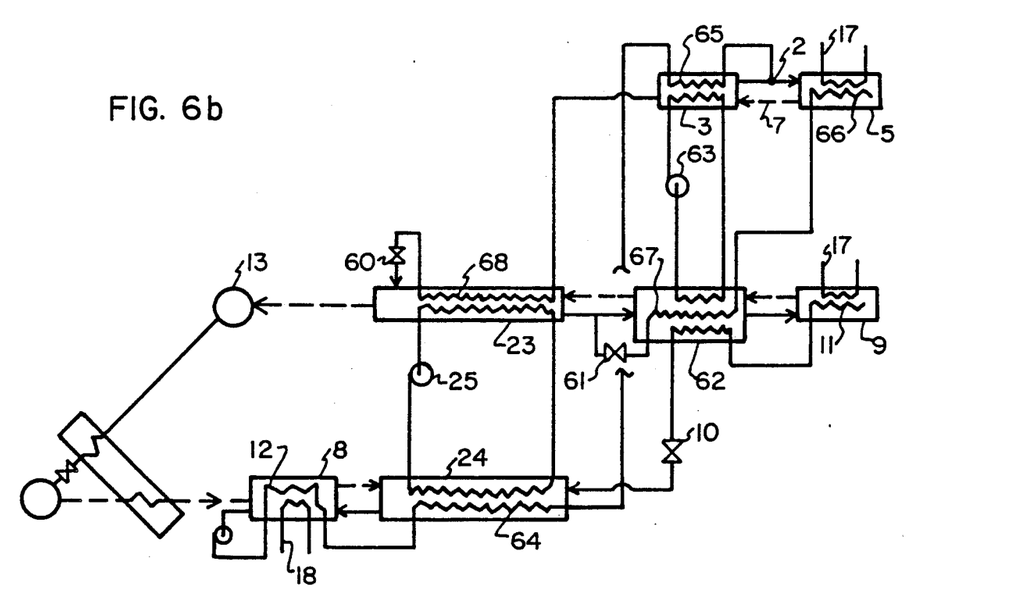

Referring to FIG. 6b, like-numbered components have the same description as in FIG. 6a. Conduit 7 conveys vapor from VX desorber 5 to VX absorber 3. GHX sensible heat exchanger 11 cools the sorbent effluent generator 9. Subcooler 14 cools the refrigerant enroute to evaporator 16. The sorbent pumped by pump 1 is subjected to conventional AHX in exchanger 12, and then to additional heating in exchangers 64 and 65, located respectively in absorbers 24 and 3. Sorbent effluent from VX desorber 5 is sensibly cooled in exchangers 66 and 67 enroute to letdown valve 61. Similarly, sorbent effluent from VX absorber 3 is cooled in exchanger 68 enroute to letdown valve 60.

The variations possible in the high pressure embodiment of this invention are analogous to those for the low pressure embodiment: they arise due to applying the cycle under different lift conditions, and also due to different handling of the sorbent effluent from the VX desorber—whether it is routed to delivery pressure, to suction pressure, or to a combination. Several high pressure variations are illustrated in FIG. 7.

Figure 7A:
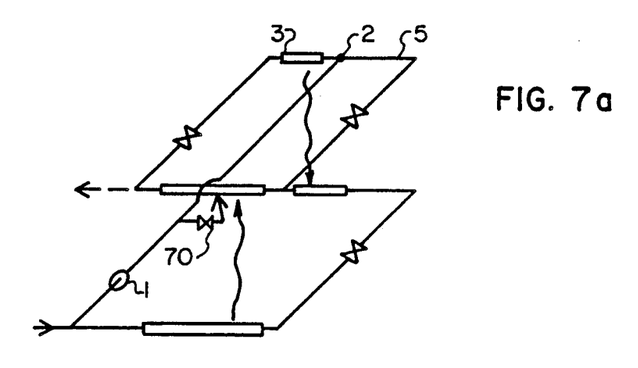
Figure 7B:
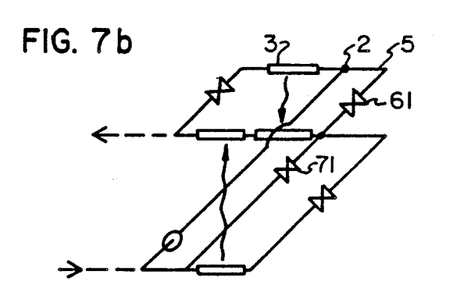
Figure 7C:
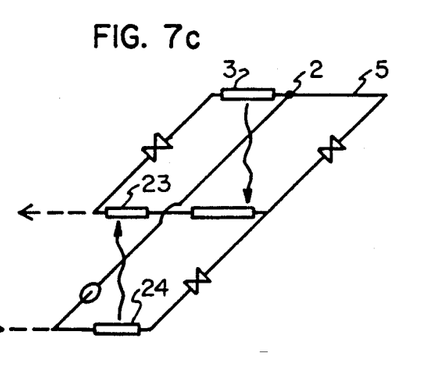
Figure 7D:
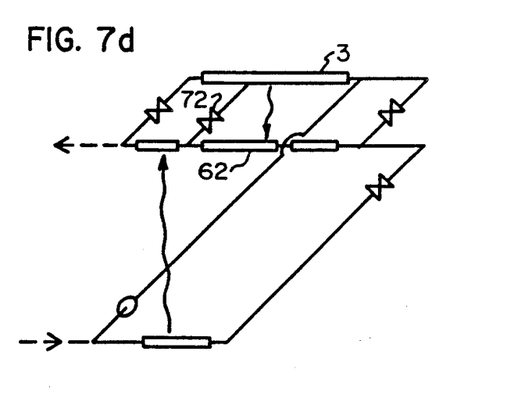

According to FIG. 7a, it is possible to divert some of the sorbent enroute to the high pressure vapor exchangers directly to delivery pressure via valve 70. According to FIG. 7b, sorbent effluent from VX desorber 5 can be split between delivery pressure and supply pressure by coordinated action of valves 61 and 71. According to FIG. 7c, it is possible to delete the externally-heated generator 9 at delivery pressure, whereby VX desorber 5 is the only externally-heated exchanger. This variation is useful when the absorption working pair has a restricted solubility field, although it reduces the temperature overlap possible between GAX absorber 24 and GAX desorber 23. According to FIG. 7d, in low-lift situations wherein there is a great deal of temperature overlap between VX absorber 3 and GAX generator 62, it is advantageous to branch a flow of sorbent through letdown valve 72 to achieve a better heat match in the GAX components.

In comparing the low pressure embodiments of FIGS. 1-3 to the high pressure embodiments of FIGS. 6-7, it is seen that the former has the advantage of no pressure greater than delivery pressure; but the disadvantages of requiring more than one sorbent pump and requiring two externally cooled absorbers. The high pressure embodiments have the advantage of only one sorbent pump, but the disadvantages of involving high pressures and usually requiring two externally-heated generators. Note, however, that the higher pressure may actually be an advantage in systems which would otherwise be under vacuum. Both the high and low pressure embodiments enjoy the advantages of requiring only two GAX heat exchanges to achieve an exceptionally efficient cycle; automatically adjusting to different lift conditions; and not having any concentration gaps to give rise to concentration mixing of the vapor.

In order to avoid concentration mixing of vapor when using volatile absorption working pairs, it is necessary to conduct the respective suction pressure absorptions and delivery pressure desorptions sequentially, i.e., in series, not in parallel. The vapor exiting a hotter generator must be routed through a colder generator but must not be joined by any other source of vapor enroute to the colder generator. The vapor-liquid contact in the generators must be countercurrent. Similarly, suction pressure vapor must never be split for supply to different temperature absorbers, but must be routed countercurrently and sequentially through all the suction pressure absorbers in order of increasing temperature.

Figure 8A:
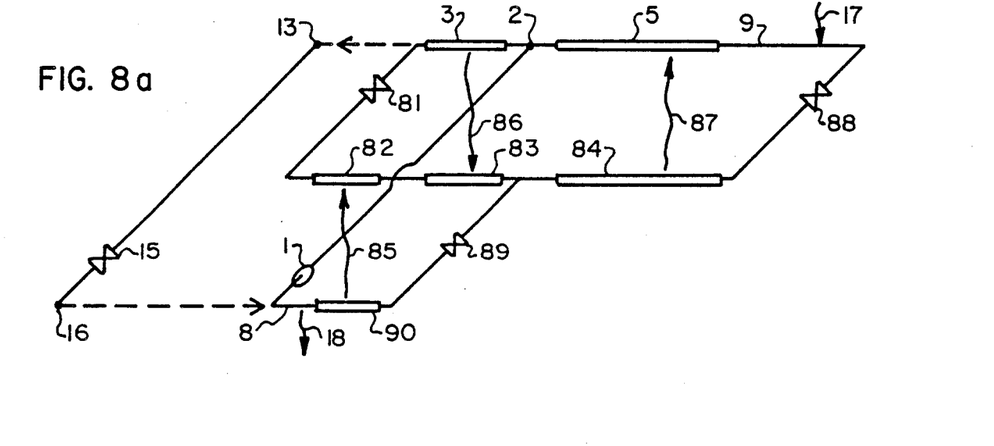

There is another embodiment of absorption compressor/heat pump possible under the generic vapor-exchange super-dilution process disclosure: the embodiment wherein the vapor exchangers are neither above or below delivery pressure, but rather are at delivery pressure. That embodiment is illustrated by FIG. 8. Referring to the thermodynamic diagram of FIG. 8a, sorbent liquid is increased in pressure to delivery pressure by pump 1, split into two streams by splitter 2, with one stream routed to VX absorber 3 and the remainder to VX desorber 5. Sorbent effluent from VX desorber 5 is supplied to the vapor-exit end of externally heated generator 9. Together, generators 5 and 9 desorb substantially more vapor than is absorbed in absorber 3, and the remainder is routed to and condensed in condenser 13. Sorbent effluent from VX absorber 3 is letdown to a pressure intermediate the supply and delivery pressure in means for pressure reduction 81, and then supplied sequentially to two generators: generator 82, heated by suction pressure absorber 90 via means for heat transfer 85; and generator 83, heated by delivery pressure absorber 3 via means for heat transfer 86. Sorbent effluent from externally-heated generator 9 is letdown to intermediate pressure by valve 88 and supplied to absorber 84. Sorbent in absorber 84 absorbs the sorbate vapor from desorbers 82 and 83, and the heat released thereby is transferred via means for heat transfer 87 to desorber 5. The sorbents effluent from desorber 83 and absorber 84 are reduced to suction pressure by valve 89 and supplied sequentially to the absorber complex comprised of absorber 90 and externally-cooled absorber 8, countercurrently to sorbate vapor from evaporator 16.

Figure 8B:
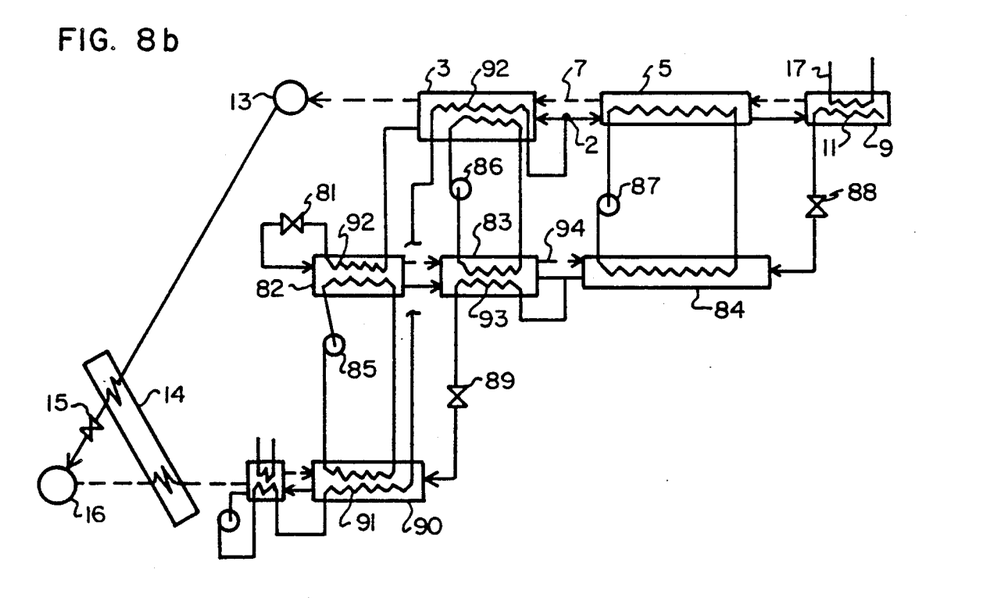

The schematic flowsheet of FIG. 8b reveals more details of the FIG. 8a cycle, with like-numbered components having the same description. Externally heated generator 9 has GHX exchanger 11, and refrigerant is subcooled in subcooler 14. Externally cooled absorber 8 has AHX exchanger 12, plus additional AHX exchangers 91 and 92. Sorbent enroute to desorber 82 is routed through GHX exchanger 92, and sorbent enroute to absorber 90 is routed through GHX exchanger 93. Conduit 7 transfers vapor from VX desorber 5 to VX absorber 3. Conduit 94 transfers vapor from desorber 83 to absorber 84. Note that the latter pair are also in vapor exchange relationship, but they differ from the super-dilution vapor exchangers in that they do not share a common source of sorbent liquid. They have distinctly different source sorbents, and a common effluent sorbent.

The delivery pressure embodiment of this invention, as depicted in FIG. 8, has the advantages that only a single sorbent pump is required, and also that there is no pressure above delivery pressure. It has the disadvantages that three separate GAX exchanges are required, and that the internal heat duty is significantly higher owing to the absorption of part of the delivery pressure vapor.

In general, the three embodiments provide a differing array of advantages and drawbacks whereby it is possible to select from them to optimize any specific application. It is also possible to combine more than one embodiment in a single cycle.

It is explicitly noted that the disclosure of the utility of a multipart absorber or generator, with one part in external heat exchange relationship and at least one other part in internal heat exchange relationship with an auxiliary (vapor exchanging) component, and with both parts adapted for countercurrent vapor-liquid contact, and with sequential sorbate vapor flow through the constituent parts, has general utility not limited to the case in which the vapor exchanging components share a common sorbent liquid supply.

I claim:

1. An apparatus for compressing a vapor comprised of:
   a) an externally-heated generator;
   b) a first internally-heated generator;
   c) an externally-cooled absorber;
   d) a first internally-cooled absorber;
   e) a means for increasing the pressure of liquid effluent from said externally-cooled absorber;
   f) a vapor-exchanging (VX) generator and a VX absorber which are in vapor-exchange relationship;
   g) a means for splitting the liquid effluent from said means for increasing pressure into at least two streams supplying one stream to said VX absorber and another stream to said VX generator;
   h) a means for supplying vapor to at least one of said externally-cooled and internally-cooled absorbers; and
   i) a means for withdrawing compressed vapor from at least one of said externally heated and internally-heated generators.

2. The apparatus according to claim 1 additionally comprised of:
   a) a means for changing the pressure of the liquid effluent from said VX absorber; and
   b) a means for supplying the effluent from said means for changing pressure to said first internally-heated generator.

3. The apparatus according to claim 1 additionally comprised of a sensible heat exchanger for at least one of the sorbent influent to and effluent from at least one of said VX absorber and VX generator.

4. The apparatus according to claim 1 additionally comprised of a means for internal latent heat exchange with at least one of said VX absorber and VX generator.

5. The apparatus according to claim 1 additionally comprised of a pump to increase the pressure of sorbent from said VX absorber to the pressure of said externally heated generator.

6. The apparatus according to claim 1 additionally comprised of a means for pressure reduction to reduce the pressure of sorbent from said VX absorber for supply to said internally heated generator; and a source of external heat for said VX generator.

7. The apparatus according to claim 1 additionally comprised of a conduit for supplying sorbate vapor from said externally heated generator to said VX generator.

8. In an apparatus for compressing a sorbate vapor from a suction pressure to a delivery pressure comprised of: an absorber which is supplied with said suction pressure vapor, a sorbent liquid, and at least two sources of cooling; plus a generator which is supplied with at least two sources of heating, the sorbent liquid, and a means for withdrawing said delivery pressure vapor; the improvement comprising:
   a) said generator comprised of at least two zones of countercurrent vapor-liquid contact;

b) a source of external heating for one of said zones;

c) a source of internal heating for another of said zones, said internal heating derived from an auxiliary absorber in which said sorbent liquid absorbs sorbate vapor at a pressure higher than said suction pressure; and d) a means for supplying all sorbate vapor from said externally heated zone to said internally heated zone.

9. The apparatus according to claim 8 additionally comprised of:

a) an auxiliary desorber at the same pressure as said auxiliary absorber b) a vapor conduit for transfer of sorbate vapor from said auxiliary desorber to said auxiliary absorber; and c) a common source of sorbent liquid for said auxiliary absorber and auxiliary desorber.

10. The apparatus according to claim 8 additionally comprised of a third zone of countercurrent vapor liquid contact in said generator which is supplied heat from one of said sources of cooling of said absorber.

11. An apparatus for increasing the sorbate content of an absorbent liquid comprising;

a) a means (1) for increasing the pressure of said absorbent liquid;

b) a means (2) for splitting pressurized liquid into at least two streams;

c) a means for directing one of said streams to an absorber (3);

d) a means (4) for providing cooling to said absorber;

e) a means for directing another of said streams to a generator (5);

f) a means (6) for providing heat to said generator; and g) a means (7) for transferring sorbate vapor from said generator to said absorber.

12. The apparatus according to claim 11 adapted to compress a sorbate vapor and additionally comprised of:

a) an externally cooled absorber (8) which is connected by a first conduit to said means for increasing pressure;

b) a means for supplying said sorbate vapor to said externally cooled absorber;

c) an externally heated generator (9) which receives absorbent liquid from at least one of said absorber (3) and said generator (5).

13. The apparatus according to claim 12 additionally comprising a pump (21) to increase the pressure of sorbent from said absorber (3).

14. The apparatus according to claim 13 additionally comprised of an absorber (26) which supplies heat to said generator (5).

15. The apparatus according to claim 14 additionally comprised of a GAX absorber (23) which receives sorbent from said pump (21); a GAX desorber (24) which receives sorbent from said generator (9); and a means (25) for transferring heat from said GAX absorber (23) to said GAX desorber (24).

16. The apparatus according to claim 15 additionally comprised of sensible heat exchangers (20) in absorbers (3) and (26) which heat sorbent from said pump (21).

17. The apparatus according to claim 16 wherein said absorbers (8), (26), and (24) and said generators (9) and (23) are all adapted for countercurrent contact between liquid sorbent and vapor sorbate.

18. The apparatus according to claim 11 additionally comprised of a means for pressure reduction (60) of sorbent effluent from said absorber (3); a generator (23) which is supplied said sorbent; a source of external heat (64) for said generator (5); an externally-cooled absorber (8); and an absorber (24) which is cooled by said generator (23).

19. The apparatus according to claim 18 additionally comprised of a generator (62) which is heated by said absorber (3); a condenser (13) for condensing vapors generated in generators (23) and (62); and an evaporator (16) for supply vapor for absorption in absorbers (8) and (24).

20. The apparatus according to claim 11 additionally comprised of an externally-heated generator (9) which receives sorbent liquid from and supplies sorbate vapor to said generator (5); a means for pressure reduction (81) of sorbate from said absorber (3); a generator (82) which receives sorbent from said means for pressure reduction; and absorber (90) which supplies heat to said generator (82); and an absorber (84) which supplies heat to said generator (5) and receives vapor from said generator (82).

21. In an apparatus for compressing a sorbate vapor from a suction pressure to a delivery pressure comprised of: an absorber which is supplied with said suction pressure vapor, a sorbent liquid, and at least two sources of cooling; plus a generator which is supplied with at least two sources of heating, the sorbent liquid, and a means for withdrawing said delivery pressure vapor; the improvement comprising:

a) said absorber comprised of at least two zones of countercurrent vapor-liquid contact;

b) a source of external cooling for one of said zones;

c) a source of internal cooling for another of said zones, said internal cooling derived from an auxiliary generator in which said sorbent liquid desorbs sorbate vapor at a pressure different than said delivery pressure; and d) a means for sequentially supplying said suction pressure sorbate vapor first to said externally cooled zone and subsequently to said internally cooled zone.

22. The apparatus according to claim 21 additionally comprised of:

a) an auxiliary absorber at the same pressure as auxiliary generator;

b) a vapor conduit for transfer of sorbate vapor from said auxiliary generator to said auxiliary absorber; and c) a common source of sorbent liquid for said auxiliary absorber and auxiliary generator.

23. The apparatus according to claim 21 additionally comprised of a third zone of countercurrent vapor liquid contact in said absorber which is supplied heating from one of said sources of cooling of said generator.

* * * * *